(12) United States Patent
Bohm

(10) Patent No.: US 8,370,536 B2
(45) Date of Patent: Feb. 5, 2013

(54) METHOD AND APPARATUS FOR PROVIDING ROBUST DISPLAY DIGITAL CHANNEL TRANSMISSION

(75) Inventor: Christian Willibald Bohm, Rattenberg (DE)

(73) Assignee: Analog Devices, Inc., Norwood, MA (US)

( * ) Notice: Subject to any disclaimer, the term of this patent is extended or adjusted under 35 U.S.C. 154(b) by 172 days.

(21) Appl. No.: 12/575,023

(22) Filed: Oct. 7, 2009

(65) Prior Publication Data

US 2010/0271486 A1  Oct. 28, 2010

Related U.S. Application Data

(60) Provisional application No. 61/172,518, filed on Apr. 24, 2009.

(51) Int. Cl.
*G06F 13/22* (2006.01)
*H04L 12/40* (2006.01)

(52) U.S. Cl. .......................................... 710/14; 370/438
(58) Field of Classification Search ................ 710/14
See application file for complete search history.

(56) References Cited

U.S. PATENT DOCUMENTS

| 7,263,152 | B2 | 8/2007 | Miller et al. | |
|---|---|---|---|---|
| 7,391,836 | B2 | 6/2008 | Miller et al. | |
| 7,460,786 | B2 | 12/2008 | Miller et al. | |
| 7,617,064 | B2 | 11/2009 | Stakely et al. | |
| 7,684,437 | B2 | 3/2010 | Miller et al. | |
| 7,702,059 | B2 | 4/2010 | Miller et al. | |
| 7,742,438 | B1* | 6/2010 | Xu et al. ....................... | 370/278 |
| 7,793,022 | B2* | 9/2010 | Travers et al. ................ | 710/110 |
| 2004/0263941 | A1 | 12/2004 | Chen et al. | |
| 2005/0182876 | A1* | 8/2005 | Kim et al. ..................... | 710/100 |
| 2006/0209892 | A1* | 9/2006 | MacMullan et al. .......... | 370/468 |
| 2006/0280055 | A1 | 12/2006 | Miller et al. | |
| 2008/0247414 | A1* | 10/2008 | Sheafor et al. ................ | 370/438 |
| 2008/0250175 | A1* | 10/2008 | Sheafor et al. ................ | 710/100 |
| 2009/0083825 | A1 | 3/2009 | Miller et al. | |
| 2010/0023825 | A1 | 1/2010 | Stakely et al. | |
| 2010/0194996 | A1* | 8/2010 | Vergoossen ................... | 348/725 |

* cited by examiner

*Primary Examiner* — Henry Tsai
*Assistant Examiner* — Titus Wong
(74) *Attorney, Agent, or Firm* — Kenyon & Kenyon LLP

(57) ABSTRACT

A method and apparatus for maintaining communication between an HDMI sources and an HDMI sink by monitoring data received from the HDMI source, and, based on the monitoring, dynamically switching between a first and a second mode without user intervention. The device may include a head end connector, a tail end connector and a cable. The head end connector may include a controller, a memory and an electrical signal transceiver. The controller may monitor data output from the source, and based on the outputted data; the controller may determine whether to maintain a first communication method or a second communication method.

22 Claims, 2 Drawing Sheets

METHOD AND APPARATUS FOR PROVIDING ROBUST DISPLAY DIGITAL CHANNEL TRANSMISSION

This application claims the benefit of U.S. Provisional Patent Application Ser. No. 61/172,518 filed on Apr. 24, 2009, the entire contents of which are incorporated herein by reference.

BACKGROUND

High-Definition Multimedia Interface (HDMI) has become the prevalent specification for transmitting digital video and audio data from high bandwidth data sources to digital data presentation devices. HDMI sources such as DVD players, Blu-ray disc players, personal computers, set-top boxes, video game consoles, etc., output video and audio data generated from these sources according to the HDMI specification. Digital data presentation devices capable of receiving the HDMI data are called HDMI sinks, and examples are digital televisions that may be either high-definition, non-high definition, computer monitors, laptop computers, video game consoles, home theater audio/video receivers, or other devices.

The HDMI audio and video data is transmitted with an accompanying low bandwidth communication channel, referred to as a "display data channel" or "DDC." The DDC has two lines: Serial Data (SDA) and Serial Clock (SCL). The two DDC lines are used to allow the HDMI source to learn about the HDMI sink's capabilities, such as screen resolution or other features, as well as for authentication when encrypted audio/video data is transferred. The DDC connection is implemented in the HDMI specification using the "inter-integrated circuit" or I2C bus specification.

The data within the DDC is Extended Display Identification Data (EDID) and High-bandwidth Digital Content Protection (HDCP) data. The EDID, which indicates the HDMI sinks capabilities, can include manufacturer name, product type, phosphor or filter type, timings supported by the display, display size, luminance data and pixel mapping data. The HDCP data is a proprietary data stream that provides copy protection to the data supplied by an HDMI source to an authenticated HDMI sink. The HDCP copy protection data is a series of keys as well as calculation results based on the series of keys that are exchanged between the HDMI source and HDMI sink. Since the EDID data is related to the hardware of the sink, it remains substantially static. In contrast, parts of the HDCP data are continuously changing because the HDMI source is continuously verifying the HDMI link.

Presently, HDMI cables connecting HDMI sources with HDMI sinks are formed from twisted-pair, copper wires that provide satisfactory connection lengths up to approximately 5 meters. The high data rates of HDMI and the line capacitance limitations of I2C bus specification limit the HDMI cables from extending beyond the approximate 5 meters. Note: There are 'adaptive equalizers' that can allow a HDMI-TX to drive up to 10 meters.

Optical cables are seen as a viable solution to overcoming the distance limitations of the present twisted-pair cable and the bandwidth limitations of wireless communication techniques. Of course, other cables, such as coaxial cables, may used in alternative embodiments of the disclosed invention since most practical cables suffer from the following limitations. The data, including I2C data, provided from the HDMI source can be serialized and sent over the cable in a serial data stream. However, the I2C datagram is a bi-directional datagram in which data sent from an HDMI source to an HDMI sink requires the exchange of data (i.e., acknowledgements and responses to data requests) between the HDMI source and HDMI sink, the uni-directional nature of the serial data stream over the cable must be interrupted to allow for the returning response or acknowledgement. This interruption introduces a delay to facilitate the I2C data exchange. This delay and the facilitation of the I2C data exchange can be addressed in a number of ways.

For example, the I2C specification defines a "clock stretching" technique to accommodate communication delays between a source and a sink, if, for example, the source requests a read of data that the sink cannot satisfy immediately. The HDMI specification states that all HDMI-compliant sources shall support this feature. Market research indicates, however, that some vendors have built equipment that, although they otherwise support HDMI protocols, do not support the clock stretching feature. These HDMI sources that do not comply with the HDMI specification can be considered HDMI compatible. In cases where a HDMI source does not support clock stretching while the device it is connected to does rely on the presence of the clock stretching functionality, communication is likely to be disrupted.

Data mirroring is another method of addressing the data latency associated with the exchange of data between the source device and the sink device. With data mirroring, data is read from the sink device and stored in an integrated circuit at a head end of an optical cable, closest to the source device. Specifically, EDID data, which represents a sink device's capabilities, and HDCP data, which supports the authentication operations for encryption and data rights management are stored in memory at the head end. Although, data mirroring attempts have been proposed for use with HDMI interconnects, all known attempts have been deemed non-compliant by HDMI ratification bodies. Therefore, there is a need for an optical cable that provides the HDMI specification-compliant operation of 'clock stretching' to those HDMI sources that support it, while at the same time offer the operational benefits to those HDMI sources that do not implement all of the features, such as clock stretching, available under the HDMI specification.

The Digital Visual Interface (DVI) specification is directed to providing high quality digital video for displays, projectors and monitors. Devices that provide DVI data would also benefit, and be suitable for use with the disclosed embodiments, or variations thereof.

DETAILED DESCRIPTION

Exemplary embodiments provide a cable for automatically maintaining communication between a digital audio/video source and a digital audio/video sink. The cable may include a head end connector, a communication medium, and a tail end connector. The head end connector may connect to the digital audio/video, and may include an electrical transceiver, a controller and a memory. The communication medium may exchange signals with the head end connector. The tail end connector may be connecting to the communication medium and deliver signals to the digital audio/video sink, the tail end connector including an electrical transceiver and a controller.

The head end connector and the tail end connector may each also include an optical transceiver.

Exemplary embodiments provide a method for automatically maintaining communication between a digital audio/video source and a digital audio/video sink. A signal indicating to the digital audio/video source a first mode of operation for communicating with the digital audio/video sink may be asserted to the digital audio/video source. In response to the asserted signal, a data line from the digital audio/video source may be monitored for receipt of digital audio/video data from the digital audio/video source. If receipt of digital audio/video data is monitored on the data line, a simulated disconnect signal may be asserted to the digital audio/video source. A reconnect may be initiated between the digital audio/video source and the digital audio/video sink with a normal exchange of data based upon the simulated disconnect signal. The first mode of operation may be changed to a second mode of operation different from the first mode of operation for communicating between the digital audio/video source and the digital audio/video sink.

Exemplary embodiments provide for a method for automatically maintaining communication between an HDMI sources and an HDMI sink by monitoring data received from the HDMI source, and, based on the monitoring, dynamically switching between a first communication method, e.g., clock stretching, and a second communication method, e.g., data mirroring, without user intervention. The device includes a head end connector, a tail end connector and an optical cable. The head end connector includes a controller, a memory, an electrical signal transceiver and an optical transceiver. The controller is configured to monitor data output from the source, and based on the outputted data; the controller determines whether to maintain a first communication method or a second communication method. This controller functionality is applicable with a coaxial cable, in a wireless implementation, or in any other implementation that replicates cable functionality. In high bandwidth radio implementation, for example, the concept would not change. A wire is bi-directional, while optical is uni-directional.

Figure 1:
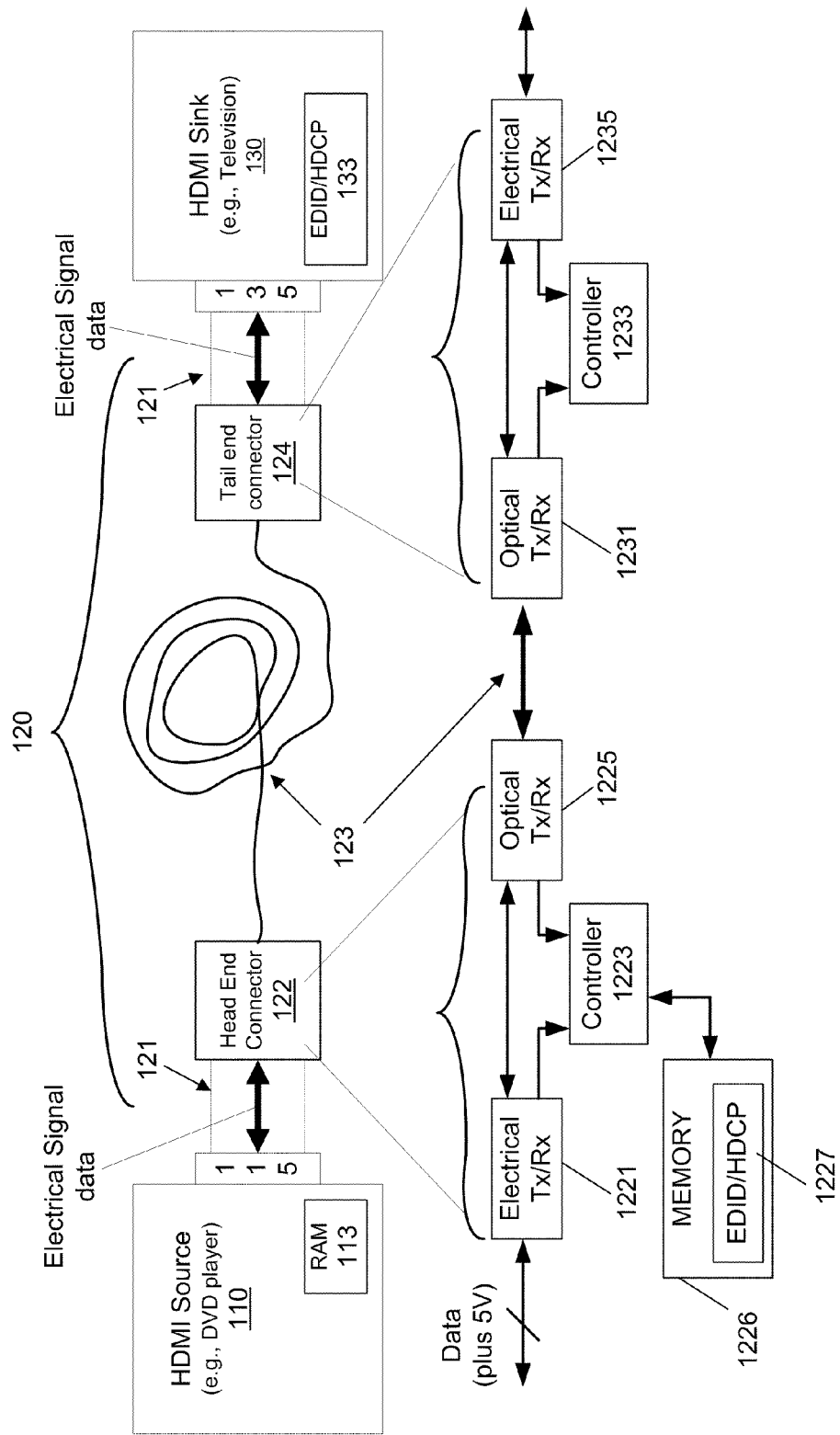
FIG. 1 illustrates a block diagram according to an exemplary embodiment of the present invention.

FIG. 1 illustrates a block diagram of an exemplary embodiment. The exemplary connecting device 120 includes a head end connector 122, a communication medium 123, and a tail end connector 124. The connecting device 120 may connect an HDMI source 110, such as a DVD player, to an HDMI sink 130, such as a television. The connecting device 120 can exchange electrical data signals with both the HDMI source 110 and the HDMI sink 130 via an HDMI connector 121. The HDMI connector 121 can be a standard HDMI connector.

The HDMI source 110 may be a device that delivers audio data, video data and/or other data. Examples of an HDMI source include DVD player, Blu-ray disc players, set-top box, video game controllers, personal computers, audio stereo devices and AV receivers. The HDMI source 110 may also include an HDMI connector interface 115, which transmits and receives electrical HDMI signals to the HDMI connector 121. The HDMI sink 130 may be a device that presents audio and/or video data and that may exchange HDMI EDID and HDCP data with the HDMI source 110. Examples of an HDMI sink include digital or analog audio devices, digital or analog televisions, and computer monitors. The HDMI sink 135 may also include an HDMI connector interface 135, which transmits and receives electrical HDMI signals to the HDMI connector 121.

The HDMI communication medium 123 can be a wireless communication medium, a wired communication medium, such as twisted pairs of copper wires, or an optical cable, such as a single fiber optic cable or several optical cables. The HDMI cable 120 may carry HDMI data between the source 110 and the sink 130. When implemented as an optical cable, the HDMI cable 120 includes a head end connector 122, a single optical fiber 123 and a tail end connector 124.

The head end connector 122 may provide HDMI signals to communication medium 123 for transmission to the HDMI sink 130. In the exemplary embodiment, the head end connector 122 may convert HDMI electrical signals to optical signals for transmission to the HDMI sink, and may convert optical signals received from HDMI sink to electrical signals for transmission to the HDMI source. The head end connector 122 may include a standard HDMI connector 121 for connection with the HDMI source connector interface 115. The connector 121 can receive a 5V signal to power the components of the cable from the HDMI source, or, alternatively, the components can have an alternate connection(s) (not shown) for a power source that may provide power for the components of the cable 120.

Optical components and electrical components that allow for the conversion of electrical signals to optical signals, and vice versa to meet the HDMI specification may be incorporated into the head end connector. For example, an electrical transceiver 1221 may exchange electrical signals, including audio data and video data, with the HDMI source 110 and an optical transceiver 1225. EDID and HDCP data may also be presented to the HDMI source 110 via the electrical transceiver 1221. Similarly, wireless communication components that allow for wireless communications capable of meeting the HDMI specification may be incorporated into the head end connector 122 to form the communication link between the head end and the tail end.

The optical transceiver 1225 may convert the electrical signals received from the HDMI source 110 into optical signals for transmission along HDMI optical cable 123; and may convert optical signals received from the HDMI sink 130 into electrical signals for transmission to the HDMI source 110. EDID and HDCP data may also be presented to the head end connector 122 via the optical interface 1225.

The head end connector 122 may also include a controller 1223 and a memory 1226. The memory 1226 may store EDID and/or HDCP data sent by an HDMI sink 130. The memory 1226 can store EDID data and HDCP data in data structure 1227. The store commands and memory locations may be based on instructions from the controller 1223. The controller 1223 may be connected to the optical transceiver 1225, the electrical transceiver 1221 and the memory 1226. The controller 1223 may monitor, via its connection to the electrical transceiver 1221, whether data is being output from the HDMI source 110. The controller 1223 may also forward or interrupt signals to the HDMI source 110 from the HDMI sink 130, and vice versa. The controller 1223 may also perform calculations based on the HDCP data received from both the HDMI source 110 and the HDMI sink 130 to satisfy the requirements of the HDCP specification. The controller 1223 may read and write to memory 1226 and data structure 1227.

In this exemplary embodiment, optical cable 123 may be a single fiber (or multiple fiber) optic cable that carries HDMI data including video and audio data as well as EDID and HDCP data between the optical transceiver 1225 of the head end connector 122 and the optical transceiver 1231 of the tail end connector 124 and back.

The tail end connector 124 may receive HDMI signals from communication medium 123 for delivery to the HDMI sink 130. The tail end connector 124 may convert HDMI electrical signals to optical signals for transmission to the HDMI source, and may convert optical signals received from the optical cable 123 connected to the HDMI source to electrical signals for the HDMI sink.

Electrical transceiver 1235 may exchange electrical signals, including audio and video data, with the HDMI sink 130 and the optical interface 1231. EDID and HDCP data may also be presented to the HDMI source 110 via the electrical transceiver 1235.

Optical transceiver 1231 may provide the conversion of electrical signals received from the HDMI sink 130 into optical signals for transmission along HDMI optical cable 123; and conversion of optical signals received from the HDMI source 110 into electrical signals for transmission to the HDMI sink 130. The EDID and HDCP data is also presented to the tail end connector 124 via the optical interface 1235. Similarly, wireless communication components that allow for wireless communications capable of meeting the HDMI specification may be incorporated into the head end connector 122.

A controller 1233 is connected to the optical transceiver 1235 and the electrical transceiver 1231. The controller 1233 can be implemented in hardware or software. The controller 1233 facilitates the exchange of information between the optical transceiver 1231 and electrical transceiver 1235.

Figure 2:
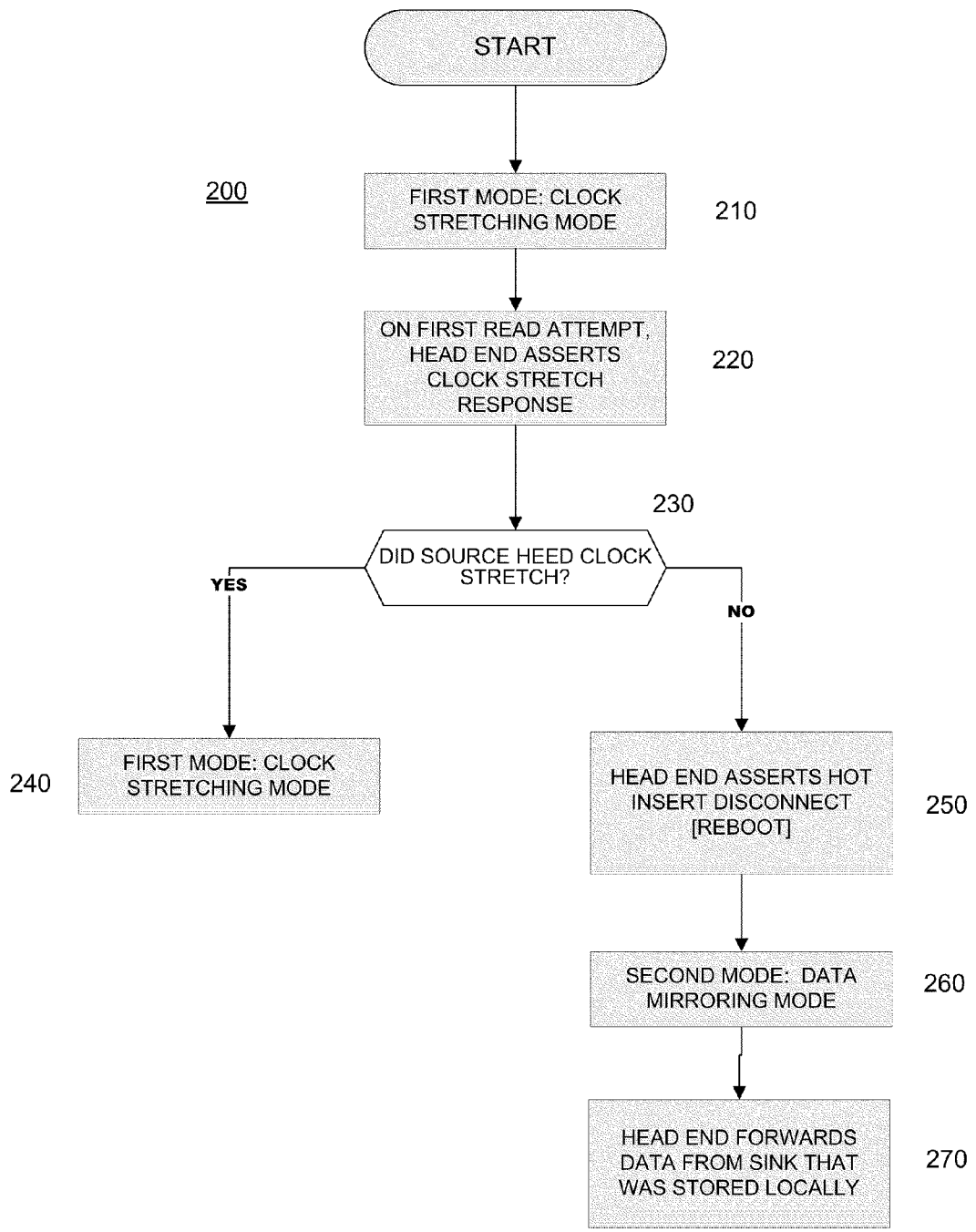
FIG. 2 illustrates a process flow chart according to an exemplary embodiment of the present invention.

FIG. 2 illustrates an exemplary embodiment of a process 200 to control the exchange of data between an HDMI source and an HDMI sink. As mentioned above, the exemplary connector 120 can function in a first mode or a second mode. The first mode may utilize clock stretching techniques, while a second mode may utilize data mirroring techniques.

At step 210, the communication process between the HDMI source and the HDMI sink may begin in a clock stretching mode of operation. The communication may include a form of handshaking that may occur when an HDMI sink is connected to an HDMI source that results in the exchange of EDID and HDCP data. Alternatively, the EDID and HDCP data need not be exchanged at all, or after some delay.

The HDMI source and HDMI sink may begin exchanging data in a "clock stretching" first mode. Specifically, to begin exchanging data in the first mode, the SCL line in the DDC is held LOW by the controller in the head End connector (Step 220).

While the SCL line is maintained in a LOW state, the data line from the HDMI source may be monitored to detect receipt of any data from the HDMI source. (Step 230).

When receipt of data is detected on the data line while the SCL line is held LOW, this is an indication that the source is not receptive to operating in the first mode, or the "clock stretching" mode, and the process continues to step 250. Alternatively, if no data is detected on the data line while the SCL line is held LOW, the exchange of data is maintained in the "clock stretching mode" as indicated at step 240.

Since the source is not receptive to operating in the first, or "clock stretching", mode. At step 250, a simulated disconnect signal is asserted, for example, by the controller 1223 of FIG. 1, and a reconnect is initiated between the HDMI source 110 and the HDMI sink 130 with the normal exchange of data.

The disconnect is simulated by outputting a pseudo hot plug detection signal to the HDMI source 110 from controller 1223 causing the HDMI source 110 to re-set, and re-establish connection to the HDMI sink 130. For example, hot plug detect can be an upstream signal, such 5V high, when the HDMI sink, such as a television, is connected and switched "ON", i.e., ready to receive.

The mode of operation may be set, at step 260, to second mode, or a data mirroring mode. The data to be mirrored may include I2C data. The mirroring function may be immediately, or almost immediately, performed to accommodate the connection of the optical cable between the HDMI source 110 and the HDMI sink 130. The EDID and HDCP data related to the HDMI sink 130, including any calculation results related to the HDCP data may be stored in a memory, such as memory 1226 or data structure 1227, from the initial exchange of information during the data exchange while in the first mode, or the "clock stretching" mode, or during the re-set and re-establishing of the connection at step 250.

At step 270, the EDID and HDCP data may be read from the head end connector memory and provided to the HDMI source.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

I claim:

1. A cable for automatically maintaining HDMI data communication between a digital audio/video source and a digital audio/video sink, comprising:
   a head end connector to provide a multi-modal bus communication system to connect to the digital audio/video source, the head end connector including an electrical transceiver, a controller and a memory, the controller configured to:
      monitor data received by the electrical transceiver from the digital audio/video source;
      based on the monitored data, select between a clock stretching communication mode and a data mirroring communication mode; and
      engage a bus adjustment process according to the selected mode;
   a tail end connector for delivering signals to the digital audio/video sink, the tail end connector including an electrical transceiver and a controller; and
   a bi-directional communication medium for exchanging signals between the head end connector and the tail end connector,
   wherein the memory is configured to store EDID and HDCP data related to the digital audio/video sink.

2. The cable of claim 1, wherein the communication medium is a coaxial cable.

3. The cable of claim 1, wherein the communication medium is a wireless channel.

4. The cable of claim 1, wherein the communication medium is a fiber optic cable.

5. The cable of claim 4, wherein the fiber optic cable is formed from a single optical fiber.

6. The cable of claim 1, wherein the head end connector includes an optical transceiver and the tail end connector includes an optical transceiver.

7. The cable of claim 1, wherein the head end connector further comprises an HDMI connector for connecting to the digital audio/video source, wherein the digital audio/video source provides audio/video data in an HDMI compatible format.

8. The cable of claim 1, wherein the tail end connector further comprises an HDMI connector for connecting to the digital audio/video sink, wherein the digital audio/video sink is HDMI compatible.

9. A method for automatically maintaining communication between a digital audio/video source and a digital audio/video sink, comprising:
- asserting, from a head end connector to the digital audio/video source, a signal indicating to the digital audio/video source clock stretching communication mode for communicating with the digital audio/video sink;
- monitoring at the head end connector, in response to the asserted signal, a data line from the digital audio/video source for receipt of digital audio/video data from the digital audio/video source;
- if receipt of digital audio/video data is monitored on the data line, asserting a simulated disconnect signal to the digital audio/video source;
- initiating a reconnect between the digital audio/video source and the digital audio/video sink with a normal exchange of data based upon the simulated disconnect signal; and
- changing the clock stretching communication mode to a data mirroring communication mode for communicating between the digital audio/video source and the digital audio/video sink;
- reading, by a controller, data related to capabilities of the digital audio/video sink from a memory, wherein the memory and the controller are located in a head end of a cable; and
- delivering, by the controller, the read data to the digital audio/video source,
- wherein the data includes EDID and HDCP data related to the digital audio/video sink.

10. The method of claim 9, further comprising: maintaining the clock stretching communication mode if the monitoring does not indicate digital audio/visual data is output by the digital audio/visual source.

11. The method of claim 9, wherein initiating a reconnect comprises:
- outputting a signal from a head end of a cable connected to the digital audio/visual source, the signal being a pseudo hot plug detection signal.

12. The method of claim 9, wherein the asserting comprises:
- maintaining a signal at a predetermined level while delivering data from the digital audio/video sink related to capabilities of the digital audio/video sink.

13. A system for automatically maintaining digital data communication, comprising:
- a digital audio/video source for providing HDMI data;
- a digital audio/video sink for presenting the HDMI data to a user; and
- a communication medium device connected between the digital audio/video source and the digital audio/video sink, including:
  - a head end connector for connecting to the digital audio/video source, the head end connector including an electrical transceiver, a controller and a memory, the controller configured to:
    - monitor data received by the electrical transceiver from the digital audio/video source, and based on the monitored data, switch from a clock stretching communication mode to a data mirroring communication mode;
    - engage a bus adjustment process according to the selected mode;
  - a bi-directional communication medium for exchanging signals with the head end connector; and
  - a tail end connector for connecting the bi-directional communication medium to the digital audio/video sink and for delivering signals to the digital audio/video sink, the tail end connector including an electrical transceiver and a controller,
- wherein the memory is configured to store EDID and HDCP data related to the digital audio/video sink.

14. The system of claim 13, wherein the communication medium is a coaxial cable.

15. The system of claim 13, wherein the communication medium is a wireless channel.

16. The system of claim 13, wherein the communication medium is a fiber optic cable.

17. The system of claim 16, wherein the fiber optic cable is formed from a single optical.

18. The system of claim 13, wherein the head end connector includes an optical transceiver and the tail end connector includes an optical transceiver.

19. The system of claim 13, wherein the head end connector further comprises an HDMI connector for connecting to the digital audio/video source, wherein the digital audio/video source provides audio/video data in an HDMI compatible format.

20. The system of claim 13, wherein the tail end connector further comprises an HDMI connector for connecting to the digital audio/video sink, wherein the digital audio/video sink is HDMI compatible.

21. A cable for automatically maintaining HDMI data communication between a digital audio/video source and a digital audio/video sink, comprising:
- a head end connector for connecting to the digital audio/video source, the head end connector including an electrical transceiver, a controller, and a memory to store data sent from the digital audio/video sink, the controller configured to:
  - assert, to the digital audio/video source, a signal indicating to the digital audio/video source a clock-stretching communication mode for communicating with the digital audio/video sink;
  - monitor data received by the electrical transceiver from the digital audio/video source, in response to the asserted signal; and
  - when data is received by the transceiver in response to the asserted signal, switch from the clock-stretching communication mode to a data mirroring communication mode, during which the data stored in the head end connector memory is provided to the digital audio/video source, wherein the data stored in the memory includes EDID and HDCP data related to the digital audio/video sink;
- a tail end connector for delivering signals to the digital audio/video sink, the tail end connector including an electrical transceiver and a controller; and
- a bi-directional communication medium for exchanging signals between the head end connector and the tail end connector.

22. An integrated circuit for a head end of an HDMI cable, comprising:
- a transceiver;
- a memory; and
- a controller configured to:
  - monitor data received by the transceiver from a digital source device;
  - based on the monitored data, select between a clock-stretching communication mode and a data mirroring communication mode; and cause the transceiver to provide communication between the digital source device and the digital sink device according to the selected communication mode, wherein the memory is to store communication and encryption data from the digital sink device, and the controller is to cause the transceiver to utilize the data to provide communication between the digital source device and the digital sink device in the data mirroring communication mode, and wherein the data stored in the memory includes EDID and HDCP data for the digital sink device.

* * * * *